United States Patent Office 3,319,597
Patented May 16, 1967

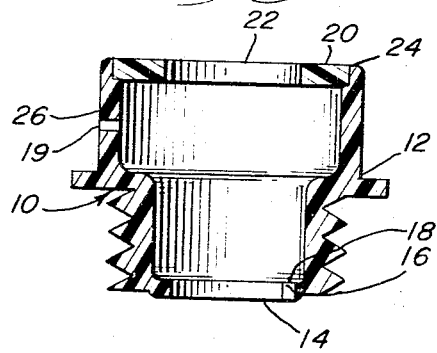
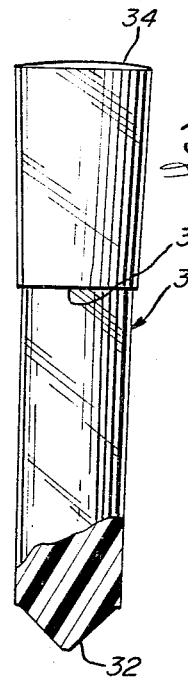
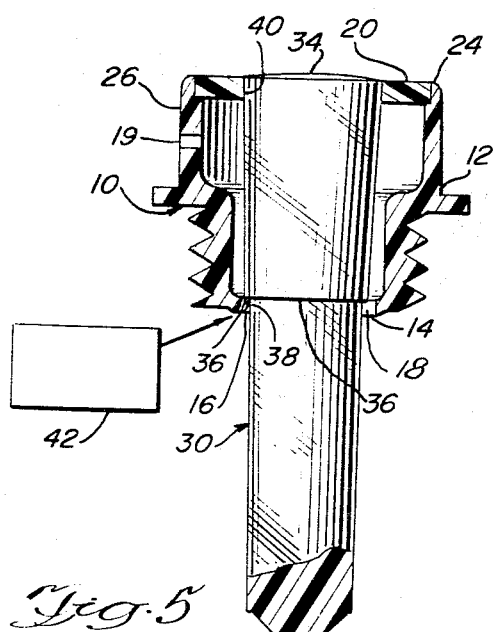
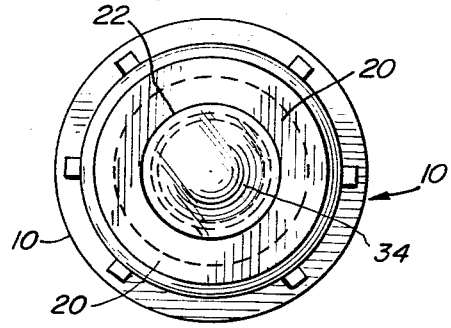
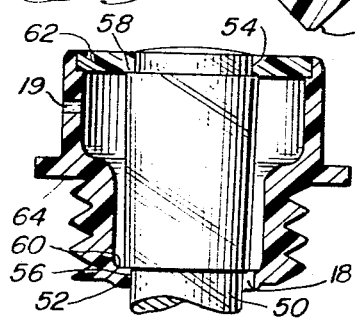
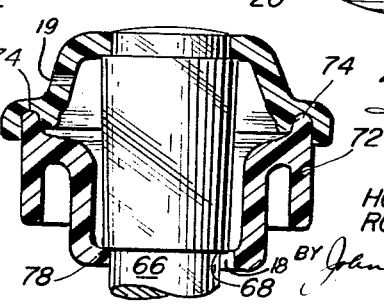
INVENTORS
HOMER D. SCHNITZIUS
ROBERT D. SULLIVAN

3,319,597
LIQUID LEVEL INDICATOR
Homer D. Schnitzius and Robert D. Sullivan, both of Indianapolis, Ind., assignors to The Richardson Company, Melrose Park, Ill., a corporation of Ohio
Filed Apr. 20, 1966, Ser. No. 543,904
6 Claims. (Cl. 116—118)

The present invention is concerned with vent plugs of the type normally employed for closing filling wells of electrical storage batteries and more particularly to vent plugs with signalling devices for indicating by means of a signal the relative level of electrolyte in the battery.

The usual electrical storage battery, particularly of the automotive type, is contained in a multiple compartment case, each compartment comprising a separate cell. Each cell is composed of electrolyte, lead plates and associated connecting elements. The cells are normally connected in series to provide the desired voltage.

The battery housing or multiple compartment case is provided with a cover having openings over the cells and openings for the electrodes, the former being usually identified as filling wells and serving as means for filling the cells with electrolyte and for replenishing the supply when necessary.

Vent plugs are employed for closing the filling wells after the addition of electrolyte. These plugs are normally provided with venting means to permit gases generated in the cells to pass through the plugs to the atmosphere. Usually, the venting means includes a baffle effect to prevent the flowing gases from carrying entrained electrolyte to the atmosphere. The plugs are shaped to fit or connect in the filling wells in such a way that the only passage to the atmosphere is by way of the venting means.

In the past, vent plugs have been modified to include various signalling devices for indicating the relative level of electrolyte in each cell or representative cell. These devices include the stationary type which is usually transparent and produces a light signal when the liquid level is low, and the movable type whose position in the filling well indicates the relative level of the liquid. Representative light transmitting indicators of the first type are shown in U.S. 1,883,971, U.S. 2,123,479, and U.S. 2,627,748.

In general, these signalling devices have been cylindrical rods with conical shaped lower ends to reflect the atmospheric light upwardly when the liquid level is below the conical shape. As shown in the above references, the devices are usually fitted into the vent plug body by a snap fit arrangement, by a friction fit arrangement, or the like.

In considering the relationship and manufacturing problems of the vent plug and signalling device together with the function of each and the assembly of the finished plug, we have developed a vent plug assembly having components which are both capable of mass production and readily assembled into the finished vent plug. In addition, the vent plug utilizes the structure of the signalling device as a part of the venting means of the plug.

Briefly, the invention is directed to a vent plug assembly which is adapted to be positioned in a filling well of an electrical storage battery and includes a light signalling indicator for indicating the relative level of electrolyte in the cell. The assembly comprises a hollow body having upper and lower closure ends, and a light transmitting rod of transparent material mounted in the body and extending through its ends. The light transmitting body has at least one shoulder positioned against one of the inner surfaces of the ends of the body for positioning the rod in the body and in some instances for supporting the rod in the body. Advantageously, the hollow body includes a vent opening in its lower end on one side of the rod and a vent opening in an upper portion of the body on the opposite side of the rod whereby the rod serves to provide a baffle effect to the flowing gases with entrained electrolyte. In this way, the rod without additional ridges or other projections provides a baffle effect while also being of a shape which is readily mass produced.

In describing the invention, reference will be made to the drawings wherein:

FIGURE 1 is a cross-sectional view of a representative hollow vent plug body.

FIGURE 2 is a view of a representative image-producing liquid level indicator partly in section.

FIGURE 3 is a cross-sectional view of the liquid level indicator positioned within the hollow vent plug body and includes an illustration of the use of sonic vibrations to rigidly bond the vent plug and body to the indicator.

FIGURE 4 is a plan view of the top of an assembled vent plug showing the position and exposure of the liquid level indicator.

FIGURE 5 is a cross-sectional view of a hollow vent plug body and indicator wherein the indicator has a modified shoulder arrangement.

FIGURE 6 is a cross-sectional view of a hollow vent plug body and indicator wherein the cap of the body is snapped into place and holds the indicator against the lower end of the body.

Turning now to the drawings, numeral 10 represents a hollow vent plug body which is composed of thermoplastic material such as polystyrene. It is understood that body 10 may be shaped to be screwed, friction fitted, or the like into the filling well. Body 10 is normally circular inside and is generally cup-like with a part of its upper sides outwardly flared, as represented by the numeral 12. The bottom of the cup-like body 10 is provided with a lower opening 14 adapted to receive the liquid level indicator. The rim 16 surrounding lower opening 14 also includes a small opening 18 to permit venting of the gases generated in the cell of the battery to the atmosphere. A second opening 19 is provided in the opposite wall from opening 18 to complete the vent path.

The vent plug body may be molded with an integral top or one can be later attached prior to the insertion of the liquid level indicator. The top illustrated in FIGURE 1 comprises a disc-like cap 20 provided with an opening 22 adapted to receive the liquid level indicator. The cap 20 is attached to the base portion of body 10 at the upper rim 24 in a step which comprises spinning the cap 20 on the rim 24 while applying heat to the rim to connect the cap 20 to the body 10. The application of heat to the rim permits its upper perimeter to be folded slightly inward to rigidly retain the cap and is an advantageous technique for mass producing the hollow vent plug body. The general description of the technique is further defined in U.S. 2,853,118.

As mentioned above, hollow body 10 is provided with opening 19 in upper side wall 26 to complete the venting path for gases. Opening 19 is usually located on the opposite wall from that containing opening 18 in order to channel the venting gases around the indicator before their release to the atmosphere and thereby provide a baffle effect on the gases. It will be understood that opening 19 can be located in cap 20 or in other positions on the same side of the hollow body 10. However, when cap 20 is utilized, locating opening 19 on the opposite side wall 26 from opening 18 provides an advantage in that the relationship of openings 18 and 19 is thereby constant and a baffle effect is assured. When opening 19 is provided in cap 20, the position of the opening may vary, depending upon its position in cap 20 after assembly of the cap onto the body 10.

FIGURE 2 illustrates a representative light transmitting liquid level indicator 30 which is slightly tapered in a downward direction and has an inverted conical end 32. Usually, upper end 34 is flat or may be slightly rounded, depending on the type of image desired. Indicator 30 is generally circular and advantageously includes shoulder 36 located to fit above rim 16, as shown in FIGURE 3. This arrangement results in the accurate positioning of indicator 30 in the hollow vent plug body 10. Indicator 30 is usually transparent and can be made from materials such as glass, cellulose, quartz, or a thermoplastic material such as polystyrene. Usually, a thermoplastic material, and particularly polystyrene, is preferred because of the ease in producing various shapes of the indicator and the low cost of the resultant molded product.

FIGURE 3 illustrates a coss-sectional view of the liquid level indicator 30 positioned in hollow body 10 with cap 20. As illustrated, indicator 30 has circular shoulders 36 which rest on the upper rim 16 of hollow body 10. Also illustrated is lower opening 18 and upper opening 19 as the venting means.

In FIGURE 3, the position of liquid level indicator 30 is against one or more of the inner surfaces of the hollow body 10. As illustrated, the inner surfaces are 38 of the lower rim 16 and 40 of the upper cap 20. After indicator 30 is positioned in the hollow body 10, the combination of hollow body and indicator is advantageously sonically vibrated to bond the thermoplastic body to the indicator 30. Device 42 illustrates a device for generating sonic waves to form the desired bond. The sonic vibrations are carried out to generate heat at the juncture or junctures of body 10 and indicator 30. Usually, indicator 30 is smooth and therefore a substantial amount of the heat generated is developed at the rougher surfaces of body 10. When the indicator is constructed of thermoplastic material, such as polystyrene, the sonic vibrations may create a mutual bond of the body 10 and indicator 30 without significantly causing any distortion in the shape of indicator 30. By this technique, the bond between body 10 and indicator 30 is produced without requiring the direct application of heat against the outer shape of body 10 or against indicator 30 and results in a bond without distortion in the image-producing function of the indicator and without distortion in the outer shape of the thermoplastic, hollow vent plug body. Description of the general art of sonic vibration is found in U.S. 3,224,916.

FIGURE 4 illustrates an upper plan view of the vent plug showing cap 20 of hollow body 10 and top 34 of indicator 30. Referring both to FIGURES 3 and 4, when the level of electrolyte is below lower end 32 of indicator 30, the light passing down through indicator 30 is reflected in a return path to the top 34 of the indicator and viewed as a light. When the electrolyte is at or above lower end 32 of the indicator, the light is reflected into the electrolyte and therefore no light is viewed from top 34. In this way, the relative levels of the electrolyte are observed.

In FIGURE 5, indicator 50 has two shoulders 52 and 54 positioned against the inner surfaces 56 and 58 of rim 60 and cap 62. Cap 62 is fitted into the base portion 64 as previously described. In this way, the indicator is positioned in and supported by the lower end of the body. With shoulder 54, the indicator provides support for cap 62 and increased sealing effects between indicator 50 and cap 62.

In FIGURE 6, indicator 66 is provided with lower shoulder 68 positioned against surface 78 of body 72. Body 72 includes cap 74 which is snapped into the inner rim of the base portion of body 72. In this way, indicator 66 can be snugly held in place by cap 74.

As described, the method of assembly of the vent plug provides a very useful end product without many of the problems associated with prior techniques and can be utilized in producing vent plugs on a mass production basis.

It is to be understood that the embodiment described above is merely one of numerous variations which can be devised on the broad concept by those of ordinary skill in the art and the claims which are appended hereto are not limited to the specific embodiment described.

We claim:

1. A vent plug assembly adapted to be positioned in a filling well of a cell of an electrical storage battery, said assembly including a light signalling indicator for indicating the relative level of electrolyte and the cell, and comprising in combination a hollow body having upper and lower closure ends with inner and outer surfaces on said closure ends having a hollow lower portion and an outwardly flared hollow upper portion, and a light transmitting rod of transparent material mounted in the hollow body, extending through the ends of said body and terminating below said body in a conical shape, said light transmitting rod having at least one shoulder positioned against one of the inner surfaces of the ends of said body for positioning the rod in the body, and means for venting gases from the cell through the hollow body to the atmosphere, said means including a small vent opening in the lower end of the body on one side of the light-transmitting rod and a second vent opening in the body on the opposite side of the rod whereby the rod serves as a baffle for electrolyte containing gases being vented from the cell.

2. The vent plug assembly of claim 1 wherein said shoulder is positioned against the inner surface of the lower end of said body to support and position the rod in the body.

3. The vent plug assembly of claim 1 wherein said body comprises a thermoplastic cup-like member having an open upper end, and a cap-like member connected to the top of the cup-like member, said cup-like member having its upper perimeter folded slightly inward to rigidly hold said cap-like member.

4. The vent plug assembly of claim 1 wherein said body is cup-like, said light transmitting rod is mounted coaxially in said body, said rod having a shoulder positioned against the inner surface of the lower end of the body.

5. The vent plug assembly of claim 4 wherein said body comprises a lower cup-like member of thermoplastic material and having an upper open end, and a cap-like member connected to the top of the cup-like member.

6. The vent plug assembly of claim 5 wherein said body and rod are thermoplastic and are rigidly connected together at the lower end of said body.

References Cited by the Examiner

UNITED STATES PATENTS

| | | | |
|---|---|---|---|
| 1,883,971 | 10/1932 | Kryzanowsky | 73—327 |
| 2,554,557 | 5/1951 | Brown et al. | 73—327 |
| 2,627,748 | 2/1953 | Maybach et al. | 73—327 |
| 2,631,182 | 3/1953 | Hall et al. | 116—118 |
| 2,786,090 | 3/1957 | Wells | 136—182 |
| 2,853,118 | 9/1958 | Schnitzius | 156—423 |
| 2,943,530 | 7/1960 | Nagel | 73—327 |
| 3,224,915 | 12/1965 | Balamuth et al. | 156—73 |
| 3,224,916 | 12/1965 | Soloff et al. | 156—73 |
| 3,242,029 | 3/1966 | Deans | 156—73 |

LOUIS J. CAPOZI, *Primary Examiner.*